United States Patent [19]

Wallace

[11] Patent Number: 4,476,939
[45] Date of Patent: Oct. 16, 1984

[54] MULTI-FUNCTIONAL GARDEN TOOL

[76] Inventor: Gary E. Wallace, Rte. 5, #25 Lazy S La., Chico, Calif. 95926

[21] Appl. No.: 505,890

[22] Filed: Jun. 20, 1983

[51] Int. Cl.³ .............................................. A01B 1/20
[52] U.S. Cl. ........................................ 172/374; 7/116; 56/400.04; 172/375; 294/51
[58] Field of Search ....................... 172/373, 374, 375; 294/49, 51, 52; 7/114, 115, 116; 56/400.04, 400.05, 400.06; D8/6

[56] References Cited

U.S. PATENT DOCUMENTS

| | | | |
|---|---|---|---|
| 212,953 | 3/1879 | Kreider | 294/49 |
| 1,023,720 | 4/1912 | Caudell | 172/375 |
| 1,055,044 | 3/1913 | Hollander | 7/116 |
| 1,146,609 | 7/1915 | Anderson | 294/49 |
| 1,181,137 | 5/1916 | Heggland | 294/51 |
| 1,549,542 | 8/1925 | Hejma | 294/49 |
| 1,908,506 | 5/1933 | Buttress | 172/375 |
| 2,371,977 | 3/1945 | Pearce | 7/116 |
| 2,377,730 | 6/1945 | Vosbikian et al. | 7/116 X |
| 2,796,011 | 6/1957 | Schmidt | 294/52 X |

FOREIGN PATENT DOCUMENTS 41105  3/1925  Norway ........................... 56/400.05

Primary Examiner—Richard T. Stouffer
Attorney, Agent, or Firm—Mark C. Jacobs

[57]  ABSTRACT

The invention pertains to a convenient, space saving, multi-functional tool that includes a shovel, rake, spade and hoe. All of the tool functions are integrated into one master tool for the maintenance of gardens and landscaped areas, wherein each of the four separate functions can be accessed at any time in any order of desired priority or need. Two of the implement members which form part of the multi-functional tool, namely the spade and hoe, fold so that a portion of these members are held in notches on either side of the shovel to facilitate implement stowage.

6 Claims, 9 Drawing Figures

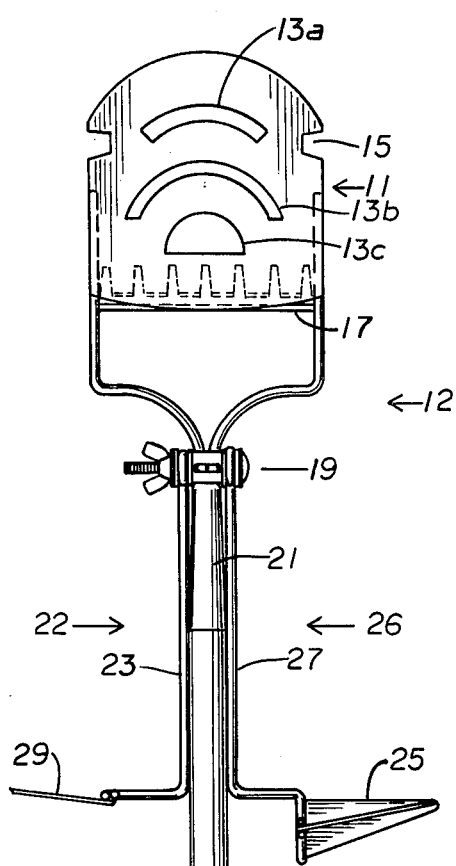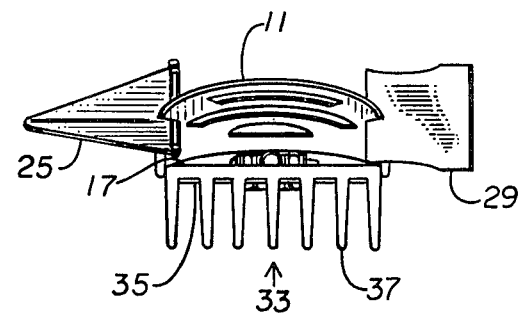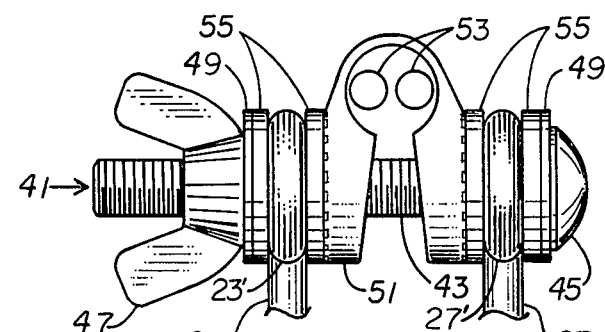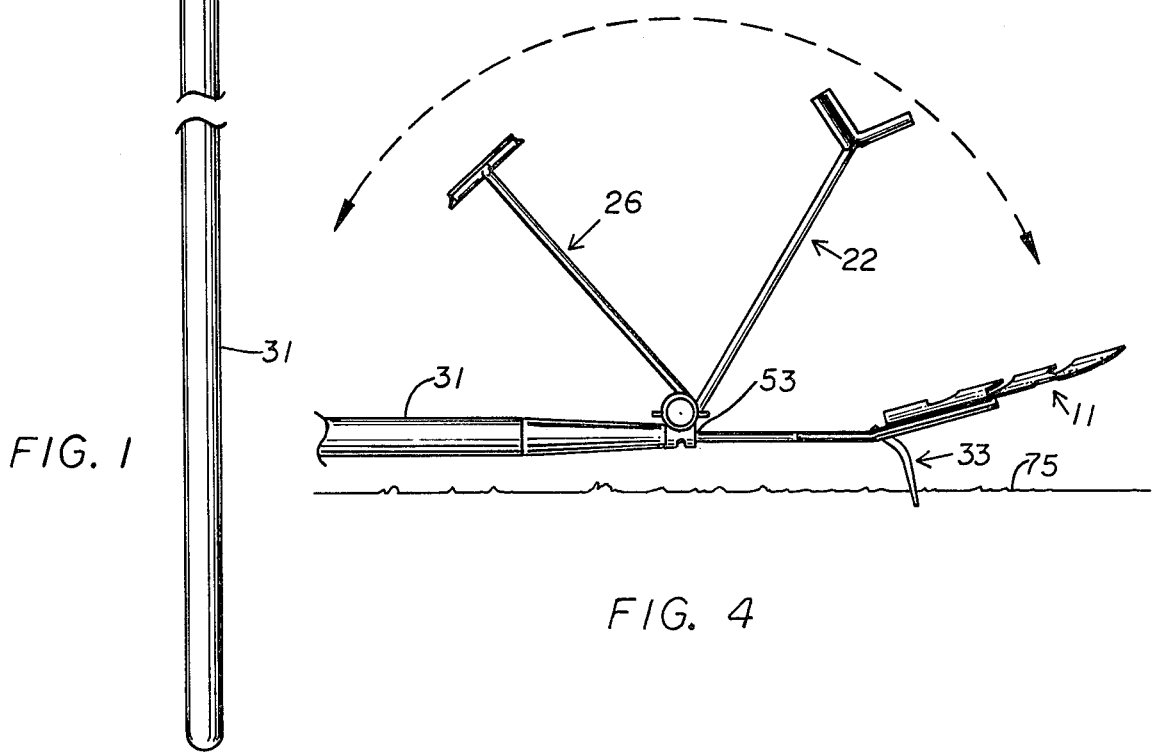

MULTI-FUNCTIONAL GARDEN TOOL

BACKGROUND OF THE INVENTION

Home gardeners and especially those having small plots of land and/or minimal storage space for tools find that they are forced to choose between using an excessive percentage of their available storage space for garden tools or, if they choose not to do so, then they are unable to do the work that they desire in a proper fashion. It has been shown, therefore, that there is indeed a need for an integrated garden maintenance tool which combines the functions of a shovel, rake, spade and hoe all into one tool. The four functions should be accessible at any time and in any order.

It is an object, therefore, of this invention to provide a multi-function garden maintenance tool.

It is another object of the invention to provide a tool wherein each function can be accessed independently and in any order from any other function.

It is yet another object to provide a low cost, multi-utility garden tool that will eliminate the need for the purchase of four individual tools.

Yet another object is to reduce the cost of maintaining a garden as well as to reduce the amount of storage space necessary to house four individual tools.

It is a still further object to provide a novel tool useful by gardeners having small plots of land.

These and other objects will in part be obvious and will in part appear hereinafter.

The invention accordingly comprises the apparatus possessing the construction, combination of elements and the arrangement of parts which are exemplified in the following detailed disclosure and the scope of the application of which will be indicated in the claims.

For a fuller understanding of the nature and objects of the invention, reference should be made to the following detailed description taken in conjunction with the accompanying drawings.

BRIEF DESCRIPTION OF THE DRAWINGS

FIG. 1 is a top plan view of the garden maintenance tool of this invention.

FIG. 2 is a front elevational view thereof.

FIG. 3 is a close-up perspective view of a portion of the instant invention.

FIG. 4 is a side elevational view of the invention in gross.

SUMMARY OF THE INVENTION

A garden maintenance tool having four (4) specific utilitarian portions each of which can be accessed individually and in any order. They include shovel, spade, hoe and rake. All of same are mounted at one end of a standard elongated handle.

DESCRIPTION OF THE PREFERRED EMBODIMENT

Figure 7:
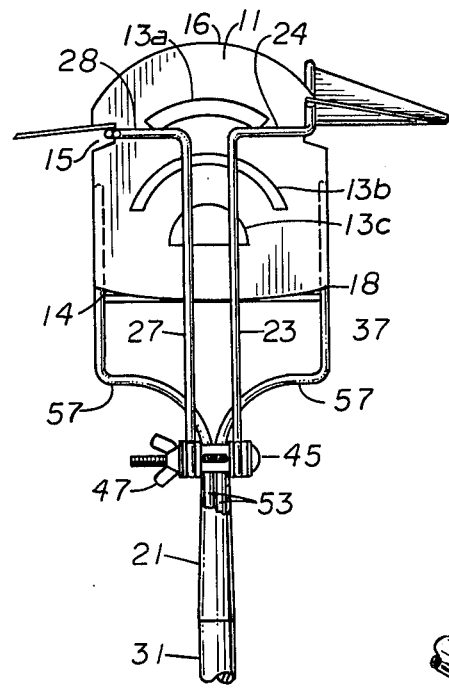
FIG. 7 is a close up, top plan view of a substantial portion of the instant invention.

In FIG. 1 there is shown the tool 10 of the instant invention. All parts of the tool are connected to handle 31 which is an elongated handle similar to those used with other garden tools individually. Head portion 12 which is attached at one end of handle 31 which includes blade 11, which is the shovel, spade portion 22, hoe portion 26, and rake portion 33. Blade portion 11 is a planar member having a slightly arcing elevation and a curved front edge 16. Blade 11 also includes a rear edge 14, used for foot placement in digging holes or in use of the rake portion as will be discussed later, and a plurality of arched slots 13a, b, and c, best shown in FIG. 7. Each of these optional slots 13a, b and c are aligned behind each other rearwardly from front edge 16. A pair of aligned notches 15, one on either side, also spaced back from the center point of the front edge. Notches 15 are employed to receive and to secure the hoe and spade arms as will be discussed below. The rear edge 14 of blade portion 11 is slightly concave. At the point of termination of the two (2) sides of the blade portion 11, namely point 18, the connecting rods 57 are secured at the point of termination 18 of the blade portion 11 and serve to secure the blade and the balance of head 12 to handle 31. Rods 57 are generally L-shaped and are in horizontal alignment with the outer edges of the blade 11. Rake portion 33 extends between these connecting points and termination points 18 across the width of the blade. In view of the fact that the rear edge 14 as previously noted is concaved inwardly, one is able to view the dirt 75 being worked by the rake 33. As is best seen in FIG. 2, rake 33 includes a tyne holder 35 horizontally disposed between the points 18 and a plurality of spaced vertical pointed tynes 37 for working the earth. While seven (7) tynes are shown, there is no criticality to the number of tynes to be employed. Preferably they are all uniformly spaced apart.

While the spade and hoe portions are visible in FIG. 1 they are more readily understood by reference to FIGS. 2 through 7. On the opposite side of handle 31 is spade portion 22 which includes spade arm 23 having an L-shaped end section 24, disposed normally outward thereto, upon which is mounted space head 25. Spade head 25 and hoe head 29 are readily seen in FIG. 2. Spade portion 22, similarly attaches to handle 31 by bolt and wing nut assembly 19 shown in FIG. 3. Hoe portion 26, though shown mounted on the left side of the tool 10 in FIG. 1, could obviously just as easily be reoriented to be mounted on the right side thereof, provided that the heads of both the spade and the hoe are directed correctly. Hoe portion 26 is seen to include an arm 27, an L-shaped end section mounted normal thereto 28 (FIG. 7) and a hoe head 29, said head being attached to the end section as by welding, brasing or otherwise securing thereto. Hoe arm 27 is secured to the handle by means of bolt and wing nut assembly 19, as will be discussed below with specific reference to FIG. 3. Both the hoe head and the spade head are directly outwardly away from the handle 31.

Figure 5:
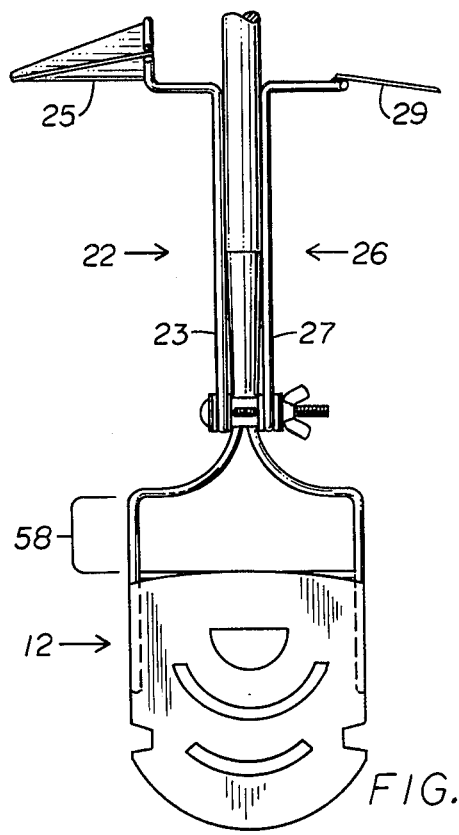
FIG. 5 is a top plan view with a portion of the invention shown at rest position.
Figure 6:
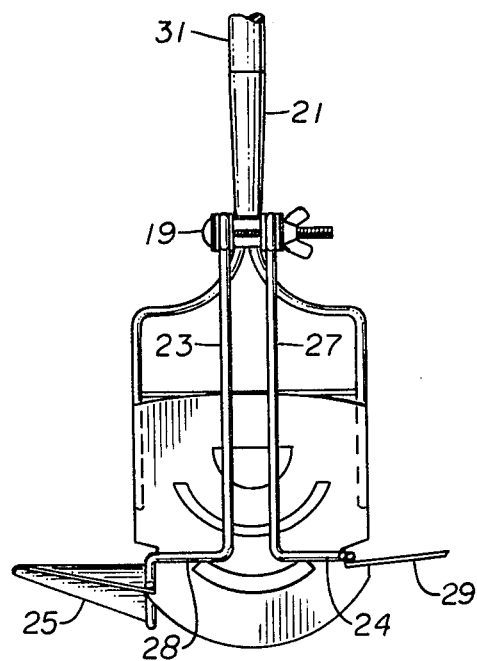
FIG. 6 is a view similar to FIG. 5 showing the same portion of the invention in its utilitarian position.

As is noted in FIG. 4, the two (2) arms 26 and 22 are pivotably mounted as by the wing nut assembly 19 such that when they are in the forward position best seen in FIG. 6 the end sections rest in the two (2) respective notches 15 on either side of the head section to help secure each of the spade and hoe in place such that they do not rotate around as also shown in FIG. 4. On the other hand, when these two tools are not being employed, they should be in their rearwardly position as shown in FIG. 5.

When one goes to use the blade, in order to insure deep penetration by said blade the operator can place his or her foot in the space designated 58 such that the underside of one's shoe will contact the rear of the blade 14 or the top of the tyne holder 35, if one is employing the garden maintenance tool as a shovel. This top is designated 17 in FIG. 2.

Figure 9:
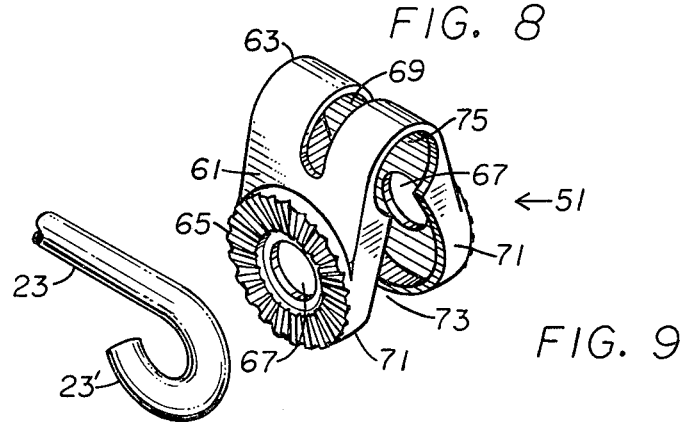
FIG. 9 is a closeup perspective view of one portion of the instant invention.

Turning now to the nut and wing assembly as shown in FIG. 3. It is seen that the entire head portion 12 and the spade and hoe portions are all joined together to the handle 31 at the toothed support mount 51, shown by itself in FIG. 9. This support is generally U-shaped and has two parallel side sections 61, and a bottom section 63 which interconnects both of 61. Each side section has a reinforcing lip 71 extending inwardly therefrom, spaced down slightly from the junction of the sides with the bottom section 63 thereby forming a keyway 73 to be discussed in detail below. Top slot 69 provides a location for spot welding or otherwise securing the ends 53 of connecting rods 57 to support 51 for added reinforcement. Circumscribing each bore 67 on the side sections 61 are a plurality of teeth, 65, usually not more than a sixteenth of an inch deep and which are used to grip the gaskets 55 adjacent thereto.

The reader's attention is now directed to FIG. 3 which depicts the use of the toothed support 51. It is seen that each of the arms 23 and 27 of the spade 22 and hoe 26 respectively terminate in an eye 23' (FIG. 9) and 27' (similar to 23', though not shown fully) through which is placed pin 41, which pin includes a head 45 and shaft 43. The pin 41 as is seen in FIG. 3, with a spacer 49 and gasket or rubber washer 55 thereupon, first penetrates one of the eyes of the armed tools, in the configuration shown, it is 27'. This eye 27' is separated from the support 51 by a gasket 55. The pin extends through this gasket, the first bore 67, and then through the second bore 67, another gasket 55, the second arm eye, here 23', a fourth gasket 55, a second spacer 49 and then wing nut 47.

Figure 8:
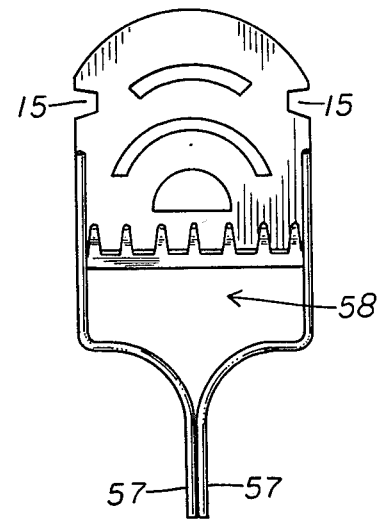
FIG. 8 is a bottom plan view of the same portion as shown in FIG. 7.

Support cone 21 seen in FIG. 6, is seen to be adjacent support mount 51 once the unattached end of the connecting rods 57 are passed through key way 73's to opening 75 and into the bore not seen in the cone 21 which is affixed to handle 31. The support 51 should be welded to the front edge of cone 21, and to the rear of arms 57 to prevent any rotation of either the support or the blade portion. In FIG. 8, the underside of the tool of this invention, one can readily see the several tynes 37 of the rake. Also shown are notches 15 for the receipt of the armed tools as shown in operative position in FIG. 6 having made the traverse from inoperative position FIG. 5 though the path indicated in FIG. 4 to the FIG. 6 location for use in the dirt designated 75.

It is seen that the convenient, space saving tool of this invention does away with the necessity of employing four separate tools, which one would want to have quickly available in the maintenance of a garden. Not only is there the convenience of having all four tools, but there is a significant cost saving in not having to purchase four separate tools. A further saving arises in time in that one need not gather all four tools to have same for utility when working.

It is believed that the device of this invention can be readily manufactured at reasonable cost and as such would be appealing to manufacturer and to the consumer.

As far as structural materials are concerned, standard construction materials such as steel can be utilized for each of the implements and wood or plastic may be employed for the handle.

It is also within the scope of the invention to omit one or more of the arcuate slots 13, which would permit finer dirt to be carried by the shovel blade, and would not permit viewing of the earth while being worked by the rake. It is furthermore within the scope to provide for pivoting of the fork portion into area 58. Means to provide a pivotal mounting of tyne holder 35 are readily understood by those skilled in the art.

Due to its low mass, namely less than that of a large conventional shovel, the device of this invention is comfortable to use over long periods of time.

Since certain changes may be made in the above apparatus without departing from the scope of the invention herein involved, it is intended that all matter contained in the above description and shown in the accompanying drawings shall be interpreted as illustrative and not in a limiting sense.

I claim:

1. A multi-functional garden tool comprising:
   a handle
   a head portion having a blade with front and rear edges, and a rake portion disposed adjacent the rear edge of the blade with its tynes generally normal to said blade, said blade being connected to said handle by,
   connecting rods attached to said handle,
   support means mounted on said connecting rods, for pivotally supporting additional garden implements, two pivotally mounted garden implements retained by said support means, one on each side of the handle, each said support means being attached to one of said connecting rods by a pivot pin, said pivot pin being horizontally disposed when said blade is vertically disposed, wherein said blade includes an inwardly concave rear surface, said blade having a pair of inwardly disposed notches on opposite sides of said blade, proximate the front edge, each of said notches being so spaced from said pivot pin and wherein said support means and said implements are so sized that when said implements are folded against said blade, a portion of each of said implements fits into one of said notches so that said notches provide for implement stowage.

2. In the garden tool of claim 1 wherein the blade includes at least one arcuate slot therein.

3. In the garden tool of claim 1 wherein said garden implements retained by said support means are a hoe and a spade.

4. In the device of claim 1 wherein the blade includes at least one laterally arcuate slot therein.

5. A multi-functional garden tool comprising:
   a shovel blade secured by connection means to,
   a support cone, which is mounted to,
   a handle,
   a support mount mounted on said connection means, and secured to at least said connection means, comprising a generally U-shaped member having a pair of aligned bores through the two parallel arms of said U-shaped member, and having,
   a threaded pin inserted through both aligned bores, said pin having a nut thereon, said pin also pivotally carrying a pair of garden implement members, one disposed on each side of said handle, wherein each of said implement members comprises an implement arm extending outwardly from the direction of said handle, and an implement on the end of said L-shaped end section attached at one end of an L-shaped arm, which arm includes an eye at the other end thereof for passage of said threaded pin therethrough, for the carrying of said implement member.

6. In the garden tool of claim 5 wherein said blade includes at least one arcuate slot therein.

* * * * *